(12) United States Patent
Wilde et al.

(10) Patent No.: US 11,964,456 B2
(45) Date of Patent: Apr. 23, 2024

(54) FIRE-RESISTANT, GAS PERMEABLE DECORATIVE LAMINATE

(71) Applicant: The Boeing Company, Chicago, IL (US)

(72) Inventors: John C. Wilde, Mill Creek, WA (US); Thomas L Brown, Jr., Lake Stevens, WA (US); Jason W. Drexler, Brier, WA (US)

(73) Assignee: The Boeing Company, Arlington, VA (US)

( * ) Notice: Subject to any disclaimer, the term of this patent is extended or adjusted under 35 U.S.C. 154(b) by 249 days.

(21) Appl. No.: 17/152,871

(22) Filed: Jan. 20, 2021

(65) Prior Publication Data

US 2021/0138773 A1 May 13, 2021

Related U.S. Application Data

(62) Division of application No. 14/633,276, filed on Feb. 27, 2015, now Pat. No. 10,926,520.

(51) Int. Cl.
| | | |
|---|---|---|
| *B32B 27/12* | (2006.01) | |
| *B32B 5/02* | (2006.01) | |
| *B32B 7/12* | (2006.01) | |
| *B32B 15/08* | (2006.01) | |
| *B32B 15/14* | (2006.01) | |
| *B32B 15/20* | (2006.01) | |
| *B32B 27/08* | (2006.01) | |
| *B32B 27/30* | (2006.01) | |
| *B32B 27/32* | (2006.01) | |

(Continued)

(52) U.S. Cl.
CPC .............. *B32B 27/12* (2013.01); *B32B 5/022* (2013.01); *B32B 5/024* (2013.01); *B32B 7/12* (2013.01); *B32B 15/08* (2013.01); *B32B 15/14* (2013.01); *B32B 15/20* (2013.01); *B32B 27/08* (2013.01); *B32B 27/304* (2013.01); *B32B 27/322* (2013.01); *B32B 37/14* (2013.01); *B32B 2262/0276* (2013.01); *B32B 2262/101* (2013.01); *B32B 2305/72* (2013.01); *B32B 2307/4023* (2013.01); *B32B 2307/724* (2013.01); *B32B 2405/00* (2013.01); *B32B 2451/00* (2013.01); *B32B 2605/003* (2013.01); *B32B 2605/18* (2013.01); *B64C 1/066* (2013.01)

(58) Field of Classification Search
CPC ......... B32B 5/022; B32B 5/024; B32B 27/12; B32B 27/08; B32B 27/304; B32B 15/08
See application file for complete search history.

(56) References Cited

U.S. PATENT DOCUMENTS 4,073,998 A * 2/1978 O'Connor ............... B32B 15/20
428/920
4,350,545 A 9/1982 Garabedian
(Continued)

FOREIGN PATENT DOCUMENTS

| EP | 3 000 593 | 3/2016 |
|---|---|---|
| EP | 3 521 009 | 8/2019 |

(Continued)

*Primary Examiner* — Larissa Rowe Emrich
(74) *Attorney, Agent, or Firm* — Walters & Wasylyna LLC

(57) ABSTRACT

A decorative laminate including a decorative layered structure defining a first surface and a second surface opposed from the first surface, and a gas permeable layer underlying the decorative layered structure.

20 Claims, 6 Drawing Sheets

(51) Int. Cl.
*B32B 37/14* (2006.01)
*B64C 1/06* (2006.01)

(56) References Cited

U.S. PATENT DOCUMENTS

| | | | |
|---|---|---|---|
| 4,373,001 | A | 2/1983 | Smith et al. |
| 5,085,921 | A | 2/1992 | Jayarajan |
| 5,897,930 | A | 4/1999 | Calhoun et al. |
| 5,976,671 | A | 11/1999 | Gleim |
| 6,630,049 | B2 | 10/2003 | Hannington et al. |
| 8,097,108 | B2 | 1/2012 | Wilde et al. |
| 8,211,530 | B2 | 7/2012 | Mead et al. |
| 2002/0081921 | A1 | 6/2002 | Vargo et al. |
| 2002/0127361 | A1* | 9/2002 | Sandt ................. G09F 3/10 428/40.1 |
| 2003/0033779 | A1 | 2/2003 | Downey |
| 2005/0025929 | A1* | 2/2005 | Smith ................. B32B 3/12 428/118 |
| 2005/0052516 | A1* | 3/2005 | Wilde ............. B64D 11/003 347/104 |
| 2006/0040091 | A1 | 2/2006 | Bletsos et al. |
| 2006/0089073 | A1* | 4/2006 | Sobieski ............ B32B 27/12 442/394 |
| 2010/0300613 | A1* | 12/2010 | Stogbauer ............ C09J 7/35 428/41.3 |

FOREIGN PATENT DOCUMENTS

| | | |
|---|---|---|
| WO | WO 02/055295 | 7/2002 |
| WO | WO 2006/047130 | 5/2006 |

\* cited by examiner

FIRE-RESISTANT, GAS PERMEABLE DECORATIVE LAMINATE

PRIORITY

This application is a divisional of U.S. Ser. No. 14/633,276 filed on Feb. 27, 2015.

FIELD

This application relates to decorative laminates and, more particularly, to gas permeable decorative laminates.

BACKGROUND

Modern aircraft typically include wings, a fuselage, various control surfaces and one or more engines. The fuselage is typically divided into separate volumes, including a passenger cabin and a cargo compartment. Passengers typically sit in the passenger cabin, while cargo, mechanical systems and electrical systems are contained in the cargo compartment.

The passenger cabin of an aircraft is typically defined by passenger cabin facing surfaces, which are within the fuselage skin. The passenger cabin panels may be constructed from strong yet lightweight materials, such as composite honeycomb sandwich panels. For aesthetic reasons, the panels forming the passenger cabin surfaces are typically decorative structures that include a decorative laminate (e.g., a decorative laminate applied with a pressure sensitive adhesive). Such decorative laminates typically include ornamentation and/or texturing.

When applying a decorative laminate to a substrate, care must be taken to avoid trapping air bubbles between the decorative laminate and the substrate. Furthermore, post-laminate-application bubble formation has been known to occur in decorative structures. Decorative structures presenting bubbles are aesthetically unacceptable. Unfortunately, it is difficult to repair decorative structures presenting bubbles. Therefore, replacement of the decorative laminate is often the most reasonable solution. However, replacement of a decorative laminate is labor-intensive and, thus, costly.

Accordingly, those skilled in the art continue with research and development efforts in the field of decorative laminates.

SUMMARY

In one aspect, the disclosed decorative laminate may include a decorative layered structure defining a first surface and a second surface opposed from the first surface, and a gas permeable layer underlying the decorative layered structure.

In another aspect, the disclosed decorative structure may include a decorative laminate having a decorative layered structure defining a first surface and a second surface opposed from the first surface, a gas permeable layer underlying the decorative layered structure and an adhesive layer, wherein the gas permeable layer is positioned between the adhesive layer and the decorative layered structure, and a substrate defining a surface, wherein the adhesive layer connects the decorative laminate to the surface.

In yet another aspect, the disclosed method for manufacturing a decorative laminate may include the steps of (1) assembling a laminate stack having a plurality of layers, the layers of the laminate stack including at least one decorative layer, (2) introducing to the laminate stack a gas permeable layer and, optionally, (3) curing the laminate stack.

Other aspects of the disclosed fire-resistant, gas permeable decorative laminate will become apparent from the following detailed description, the accompanying drawings and the appended claims.

DETAILED DESCRIPTION

Post-laminate-application bubble formation in decorative laminates is caused by gases that have become entrapped within the decorative laminate. Without being limited to any particular theory, it is believed that such gases are introduced to the decorative laminate due to out-gassing of the substrate and/or out-gassing of the decorative laminate. Therefore, as is described in greater detail herein, the disclosed decorative laminate incorporates a gas permeable layer that creates a pathway for entrapped gases, thereby reducing (if not eliminating) post-laminate-application bubble formation.

Figure 1:
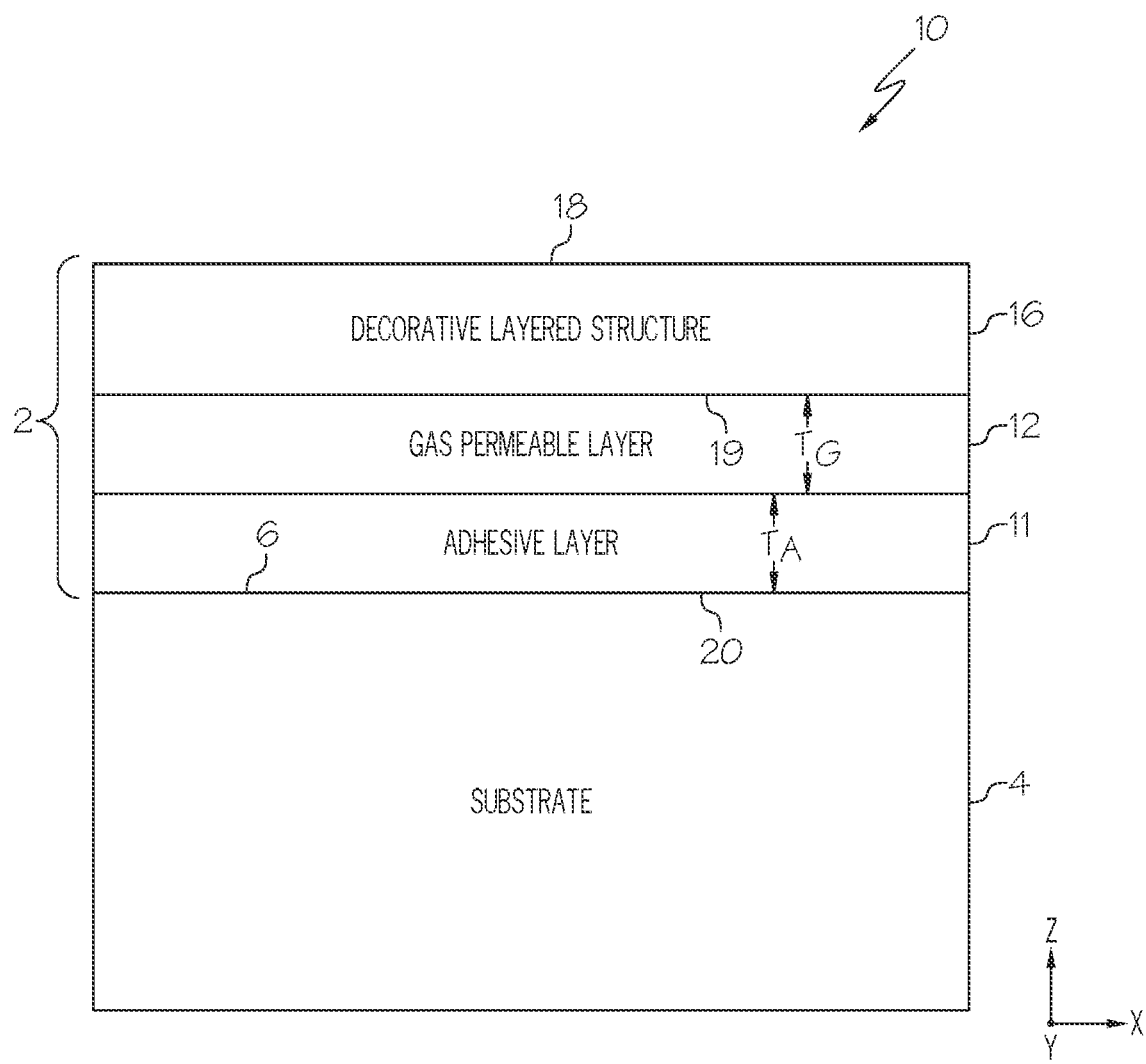
FIG. 1 is a schematic cross-sectional view of one aspect of the disclosed decorative structure, which includes a decorative laminate applied to a substrate.

Referring to FIG. 1, in one aspect, a decorative structure, generally designated 10, may include a decorative laminate 2 and a substrate 4. The substrate 4 may include a surface 6, and the decorative laminate 2 may be connected to the surface 6 of the substrate 4.

The substrate 4 of the disclosed decorative structure 10 may be any structure having a surface 6 capable of receiving the disclosed decorative laminate 2. While the surface 6 of the substrate 4 is shown in FIG. 1 as a flat, planar surface, the surface 6 of the substrate 4 may be curved and contoured in various ways without departing from the scope of the present disclosure.

The composition of the substrate 4 may depend on the intended application of the decorative structure 10. As one general, non-limiting example, the substrate 4 may be formed from (or may include) a polymeric material (e.g., a plastic panel or resin impregnated panel). As another general, non-limiting example, the substrate 4 may be formed from (or may include) a cellulosic material (e.g., paper or wood). As yet another general, non-limiting example, the substrate 4 may be formed from (or may include) a metallic material (e.g., a metal panel or sheet).

In one particular aerospace application, the substrate 4 of the disclosed decorative structure 10 may be a honeycomb sandwich panel. The honeycomb sandwich panel substrate 4 may include a honeycomb core that has been sandwiched between two liner skins. The honeycomb core of the honeycomb sandwich panel substrate 4 may include high-strength fibers (e.g., para-aramid synthetic fibers) reinforced with a thermosetting resin (e.g., phenolic resin). The skins of the honeycomb sandwich panel substrate 4 may be metal, composite, or a combination of both. As one specific, non-limiting example, the substrate 4 may be a FIBRE-LAM® honeycomb sandwich panel, which is commercially available from Hexcel Corporation of Stamford, Connecticut.

The decorative laminate 2 of the disclosed decorative structure 10 may include an adhesive layer 11, a gas permeable layer 12 and a decorative layered structure 16. The decorative layered structure 16 may define a first (e.g., outermost) surface 18 of the decorative laminate 2, and may define a second (e.g., underside) surface 19. The decorative laminate 2 may be connected to the substrate 4 to present the first surface 18 of the decorative laminate 2.

The adhesive layer 11 of the decorative laminate 2 may function to connect the decorative laminate 2 to the substrate 4. Therefore, the adhesive layer 11 may define a bonding surface 20, which may interface with the surface 6 of the substrate 4 when the decorative laminate 2 is connected to the substrate 4.

The cross-sectional thickness $T_A$ of the adhesive layer 11 of the decorative laminate 2 may depend on the composition of the adhesive layer 11, among other possible factors (e.g., the composition of the substrate 4). As one example, the cross-sectional thickness $T_A$ of the adhesive layer 11 may range from about 1 mil to about 10 mil. As another example, the cross-sectional thickness $T_A$ of the adhesive layer 11 may range from about 2 mil to about 8 mil. As another example, the cross-sectional thickness $T_A$ of the adhesive layer 11 may range from about 3 mil to about 6 mil. As yet another example, the cross-sectional thickness $T_A$ of the adhesive layer 11 may be about 5 mil.

Various adhesive compositions may be used to form the adhesive layer 11 of the decorative laminate 2. The selection of one particular adhesive over another will not result in a departure from the scope of the present disclosure.

In one expression, the adhesive layer 11 of the decorative laminate 2 may be formed from (or may include) a pressure-sensitive adhesive. As one specific, non-limiting example, the adhesive layer 11 of the decorative laminate 2 may be formed from (or may include) an acrylic-based pressure-sensitive adhesive.

In another expression, the adhesive layer 11 of the decorative laminate 2 may be formed from (or may include) a heat-activated adhesive. As one specific, non-limiting example, the adhesive layer 11 of the decorative laminate 2 may be formed from (or may include) a thermoplastic film adhesive.

At this point, those skilled in the art will appreciate that the adhesive layer 11 of the decorative laminate 2 may be pre-applied to the decorative laminate 2 or applied during application of the decorative laminate 2 to the substrate 4. Whether the adhesive layer 11 is pre-applied may depend on various factors, such as the composition of the adhesive layer 11. When the adhesive layer 11 is pre-applied, the adhesive layer 11 may optionally be covered with a release liner, which may be removed and discarded upon application of the decorative laminate 2 to the substrate 4.

The gas permeable layer 12 of the decorative laminate 2 may underlie the decorative layered structure 16, and may define continuous voids within the decorative laminate 2. Therefore, any gases that become entrapped within the decorative laminate 2 may permeate in the x-axis, y-axis, and z-axis directions through the gas permeable layer 12. As such, the gas permeable layer 12 may facilitate the diffusion of entrapped gases, thereby reducing (if not eliminating) bubble formation.

The cross-sectional thickness $T_G$ of the gas permeable layer 12 of the decorative laminate 2 may depend on the composition of the gas permeable layer 12, particularly the void structure of the gas permeable layer 12 (e.g., more voids equals less cross-sectional thickness $T_G$). If the cross-sectional thickness $T_G$ is too small, the gas permeable layer 12 may be less likely to adequately diffuse any trapped gases. If the cross-sectional thickness $T_G$ is too great, the thick gas permeable layer 12 may impact the structural integrity of the decorative laminate 2. As one example, the cross-sectional thickness $T_G$ of the gas permeable layer 12 may range from about 1 mil to about 15 mil. As another example, the cross-sectional thickness $T_G$ of the gas permeable layer 12 may range from about 1 mil to about 10 mil. As another example, the cross-sectional thickness $T_G$ of the gas permeable layer 12 may range from about 2 mil to about 8 mil. As another example, the cross-sectional thickness $T_G$ of the gas permeable layer 12 may range from about 3 mil to about 7 mil. As yet another example, the cross-sectional thickness $T_G$ of the gas permeable layer 12 may be about 7 mil.

Various gas permeable materials may be used to form the gas permeable layer 12 of the decorative laminate 2. Gas permeable material selection may include consideration of the temperatures (e.g., 300° F. to 330° F.) and pressures (e.g., 90 psi to 110 psi) used during laminate layup and formation. Appropriate gas permeable materials may substantially retain their void structure after being subjected to such elevated temperatures and pressures.

In one expression, the gas permeable layer 12 of the decorative laminate 2 may be formed from (or may include) a non-woven material. Use of a non-woven material in the gas permeable layer 12 may provide the desired gas permeability in the x-axis, y-axis, and z-axis directions without presenting a weave pattern on the first surface 18 of the decorative laminate 2.

Various non-woven materials may be used as (or in) the gas permeable layer 12 of the decorative laminate 2 without departing from the scope of the present disclosure. One general, non-limiting example of a non-woven material suitable for use as the gas permeable layer 12 is spun bond polymer (e.g., polyester). Another general, non-limiting example of a non-woven material suitable for use as the gas permeable layer 12 is felt, such natural material felt or synthetic material (e.g., aramid material) felt. Another general, non-limiting example of a non-woven material suitable for use as the gas permeable layer 12 is melt blown polymer. Yet another general, non-limiting example of a non-woven material suitable for use as the gas permeable layer 12 is fiberglass. One specific, non-limiting example of a non-woven material suitable for use as the gas permeable layer 12 is REEMAY® spun bond polyester, which is commercially available from Fiberweb, Inc. of Old Hickory, Tennessee Another specific, non-limiting example of a non-woven material suitable for use as the gas permeable layer 12 is NOMEX® felt, which is commercially available from E. I. du Pont de Nemours and Company and Wilmington, Delaware.

In another expression, the gas permeable layer 12 of the decorative laminate 2 may be formed from (or may include) a woven material. When using a woven material as (or in) the gas permeable layer 12, it may be necessary to consider (for aesthetic purposes) whether the weave pattern of the woven material will become visibly presented on the first surface 18 of the decorative laminate 2. Woven materials formed from relatively thinner fibers and/or having a tighter weave may be less likely to present on the first surface 18 of the decorative laminate 2.

Various woven materials may be used as the gas permeable layer 12 of the decorative laminate 2 without departing from the scope of the present disclosure. As one general, non-limiting example, the gas permeable layer 12 may be formed from (or may include) a woven aramid material fabric. As one specific, non-limiting example, the gas permeable layer 112 may be formed from (or may include) woven NOMEX® fabric.

The decorative layered structure 16 of the decorative laminate 2 may provide the decorative laminate 2 with the desired aesthetic visual appearance and/or texture. However, one or more components of the decorative layered structure 16 may also contribute additional functionality, such a fire resistance, to the decorative laminate 2.

The configuration and composition of the decorative layered structure 16 of the decorative laminate 2 may widely vary. While three specific, non-limiting examples are discussed below with reference to FIGS. 2-4, variations in the configuration and/or composition of the decorative layered structure 16 will not result in a departure from the scope of the present disclosure.

Figure 2:
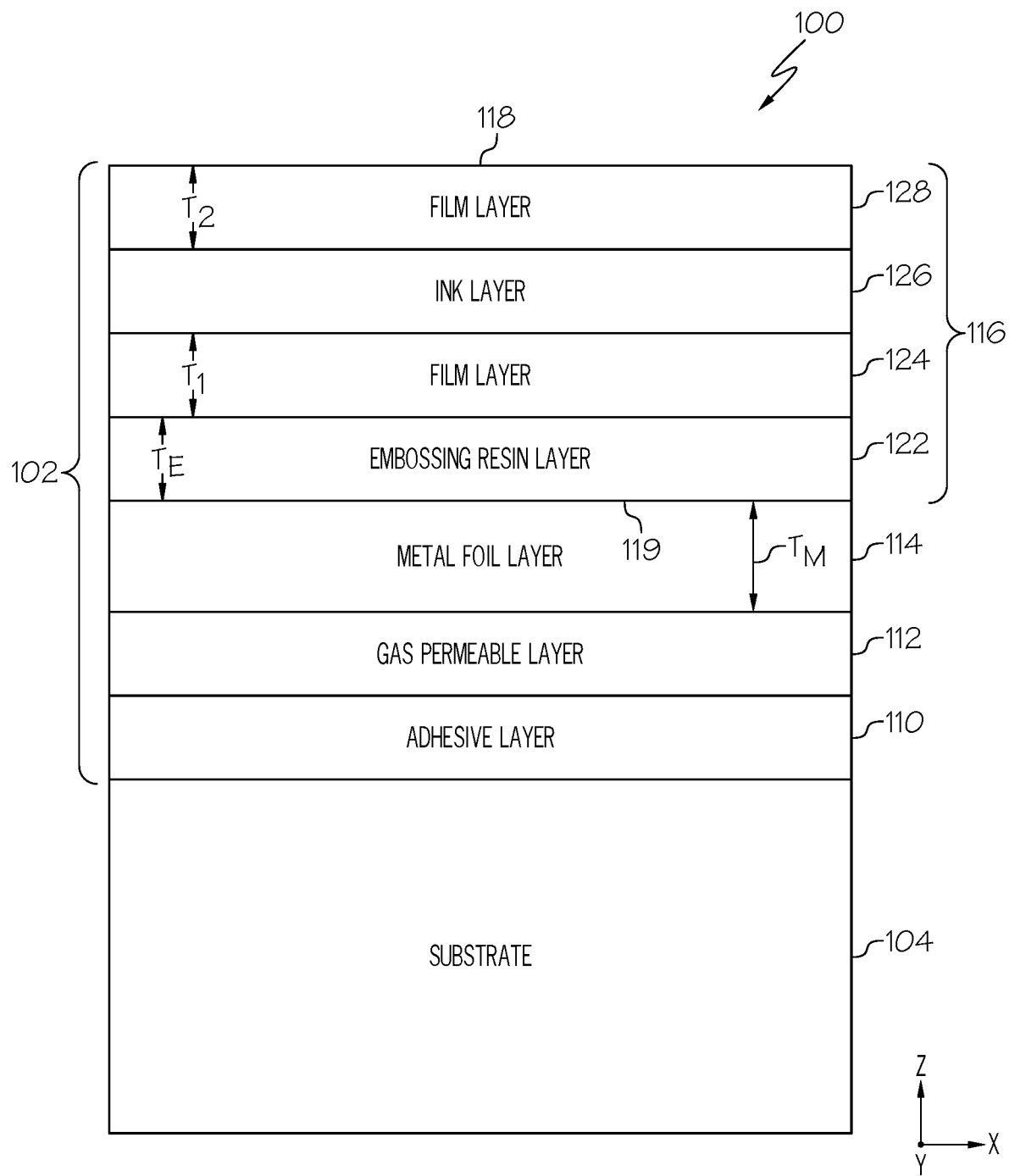
FIG. 2 is a schematic cross-sectional view of one example of a fire-resistant, gas permeable decorative laminate, shown applied to a substrate to form a decorative structure.

Referring to FIG. 2, in one example, a decorative structure, generally designated 100, may include a fire-resistant, gas permeable decorative laminate 102 and a substrate 104. The fire-resistant, gas permeable decorative laminate 102 may include an adhesive layer 110, a gas permeable layer 112 and a decorative layered structure 116.

The decorative layered structure 116 may define a first (e.g., outermost) surface 118 of the fire-resistant, gas permeable decorative laminate 102, and may define a second (e.g., underside) surface 119. The fire-resistant, gas permeable decorative laminate 102 may be connected to the substrate 104 to present the first surface 118 of the fire-resistant, gas permeable decorative laminate 102.

The decorative layered structure 116 may include an embossing resin layer 122, a first (e.g., under) film layer 124, an ink layer 126 and a second (e.g., over) film layer 128. The embossing resin layer may be positioned between the gas permeable layer 112 and the first film layer 124. The ink layer 126 may be positioned between the first film layer 124 and the second film layer 128. The second film layer 128 may define the first surface 118 of the fire-resistant, gas permeable decorative laminate 102. The decorative layered structure 116 may define the second surface 119 vertically opposed from the first surface 118.

The embossing resin layer 122 of the decorative layered structure 116 of the fire-resistant, gas permeable decorative laminate 102 may include an embossable polymeric material, such as a thermosetting resin. Upon application of heat and pressure by an embossing die, the thermosetting resin may be cured and may assume the texture/relief pattern of the embossing die. The other layers (the first film layer 124, the ink layer 126 and the second film layer 128) of the decorative layered structure 116, being connected to (and vertically above) the embossing resin layer 122, may assume the contour of the embossing resin layer 122.

The cross-sectional thickness $T_E$ of the embossing resin layer 122 of the decorative layered structure 116 of the fire-resistant, gas permeable decorative laminate 102 may depend on the desired texture/relief pattern, among other possible factors. As one example, the cross-sectional thickness $T_E$ of the embossing resin layer 122 may range from about 1 mil to about 10 mil. As another example, the cross-sectional thickness $T_E$ of the embossing resin layer 122 may range from about 2 mil to about 8 mil. As another example, the cross-sectional thickness $T_E$ of the embossing resin layer 122 may range from about 3 mil to about 6 mil. As yet another example, the cross-sectional thickness $T_E$ of the embossing resin layer 122 may be about 3 mil.

Various thermosetting resins may be used to form the embossing resin layer 122 of the decorative layered structure 116 of the fire-resistant, gas permeable decorative laminate 102. As one specific, non-limiting example, the embossing resin layer 122 may include a polyurethane resin. Other polymeric materials, such as thermoplastics, may also be used as (or in) the embossing resin layer 122 without departing from the scope of the present disclosure.

The first film layer 124 of the decorative layered structure 116 of the fire-resistant, gas permeable decorative laminate 102 may be formed from (or may include) a thermoplastic polymer. The first film layer 124 may be opaque such that the first film layer 124 functions as a uniform, clean backdrop for the overlying ink layer 126. For example, the first film layer 124 may be colored solid white.

Various thermoplastic polymers may be used to form the first film layer 124 of the decorative layered structure 116 of the fire-resistant, gas permeable decorative laminate 102. As one general, non-limiting example, the first film layer 124 may be formed from (or may include) a fluorinated organic polymer. As one specific, non-limiting example, the first film layer 124 may be formed from (or may include) polyvinyl fluoride (PVF), such as TEDLAR® polyvinyl fluoride, which is commercially available from E. I. du Pont de Nemours and Company. As another specific, non-limiting example, the first film layer 124 may be formed from (or may include) white-colored polyvinyl fluoride (PVF).

The cross-sectional thickness $T_1$ of the first film layer 124 of the decorative layered structure 116 of the fire-resistant, gas permeable decorative laminate 102 may depend on the composition of the first film layer 124, among other possible factors. As one example, the cross-sectional thickness $T_1$ of the first film layer 124 may range from about 0.5 mil to about 5 mil. As another example, the cross-sectional thickness $T_1$ of the first film layer 124 may range from about 1 mil to about 3 mil. As yet another example, the cross-sectional thickness $T_1$ of the first film layer 124 may be about 2 mil.

The ink layer 126 of the decorative layered structure 116 of the fire-resistant, gas permeable decorative laminate 102 may provide visual ornamentation (e.g., graphics and/or text) to the decorative layered structure 116. For example, the ink layer 126 may include an ink composition (e.g., toner) deposited onto the first film layer 124 and/or the second film layer 128. Various techniques, such as screen-printing, ink jet printing, laser printing, gravure processes, electrostatic transfer, manual marking and the like, may be used to deposit the ink layer 126.

The second film layer 128 of the decorative layered structure 116 of the fire-resistant, gas permeable decorative laminate 102 may be formed from (or may include) a thermoplastic polymer. The second film layer 128 may be generally transparent, and may function as a protective cap layer over the ink layer 126.

Various thermoplastic polymers may be used to form the second film layer 128 of the decorative layered structure 116 of the fire-resistant, gas permeable decorative laminate 102. As one general, non-limiting example, the second film layer 128 may be formed from (or may include) a fluorinated organic polymer. As one specific, non-limiting example, the second film layer 128 may be formed from (or may include)

polyvinyl fluoride (PVF), such as TEDLAR® polyvinyl fluoride, which is commercially available from E. I. du Pont de Nemours and Company.

The cross-sectional thickness $T_2$ of the second film layer 128 of the decorative layered structure 116 of the fire-resistant, gas permeable decorative laminate 102 may depend on the composition of the second film layer 128, among other possible factors. As one example, the cross-sectional thickness $T_2$ of the second film layer 128 may range from about 0.3 mil to about 3 mil. As another example, the cross-sectional thickness $T_2$ of the second film layer 128 may range from about 0.5 mil to about 2 mil. As yet another example, the cross-sectional thickness $T_2$ of the second film layer 128 may be about 1 mil.

Optionally, the fire-resistant, gas permeable decorative laminate 102 may further include a metal foil layer 114. The metal foil layer 114 may be positioned vertically above the gas permeable layer 112 such that the gas permeable layer 112 is positioned between the metal foil layer 114 and the adhesive layer 110. Because the metal foil layer 114 may be impervious to many gases, positioning the metal foil layer 114 vertically above the gas permeable layer 112 may allow gases emanating from the substrate 104 and/or the adhesive layer 110 to pass into the gas permeable layer 112 without being impeded by the metal foil layer 114.

The metal foil layer 114 may impart a degree of fire resistance to the fire-resistant, gas permeable decorative laminate 102. Specifically, the metal foil layer 114 may function as a gas barrier between the substrate 104 and the decorative layered structure 116, thereby inhibiting flame propagation, and may also function as a heat barrier between the substrate 104 and the decorative layered structure 116, thereby inhibiting heat transfer.

The cross-sectional thickness $T_M$ of the metal foil layer 114 of the fire-resistant, gas permeable decorative laminate 102 may depend on the composition of the metal foil layer 114, among other possible factors. As one example, the cross-sectional thickness $T_M$ of the metal foil layer 114 may range from about 0.1 mil to about 5 mil. As another example, the cross-sectional thickness $T_M$ of the metal foil layer 114 may range from about 0.5 mil to about 2 mil. As yet another example, the cross-sectional thickness $T_M$ of the metal foil layer 114 may range from about 0.7 mil to about 1 mil.

Various metals may be used to form the metal foil layer 114 of the fire-resistant, gas permeable decorative laminate 102. For example, the metal foil layer 114 may be formed from or may include aluminum (e.g., aluminum foil). The selection of one particular metal over another will not result in a departure from the scope of the present disclosure.

In one particular implementation, the metal foil layer 114 of the fire-resistant, gas permeable decorative laminate 102 may be a pre-consolidated multi-layer composite structure that includes at least one metallic layer (e.g., aluminum foil) and at least one polymeric layer. The polymeric layer of the multi-layer composite structure may be formed from (or may include) a thermoplastic fluorinated organic polymer, such as polyvinyl fluoride (PVF) (e.g., TEDLAR® polyvinyl fluoride, which is commercially available from E. I. du Pont de Nemours and Company of Wilmington, Delaware). The polymeric layer of the multi-layer composite structure may be connected to the metallic layer, such as with an adhesive (e.g., an acrylic adhesive). For example, the multi-layer composite structure may have the following composition: 2 mil polyvinyl fluoride film (DuPont™ TEDLAR®)/ 0.2 mil acrylic adhesive/0.7 mil aluminum foil/0.2 mil acrylic adhesive.

Figure 3:
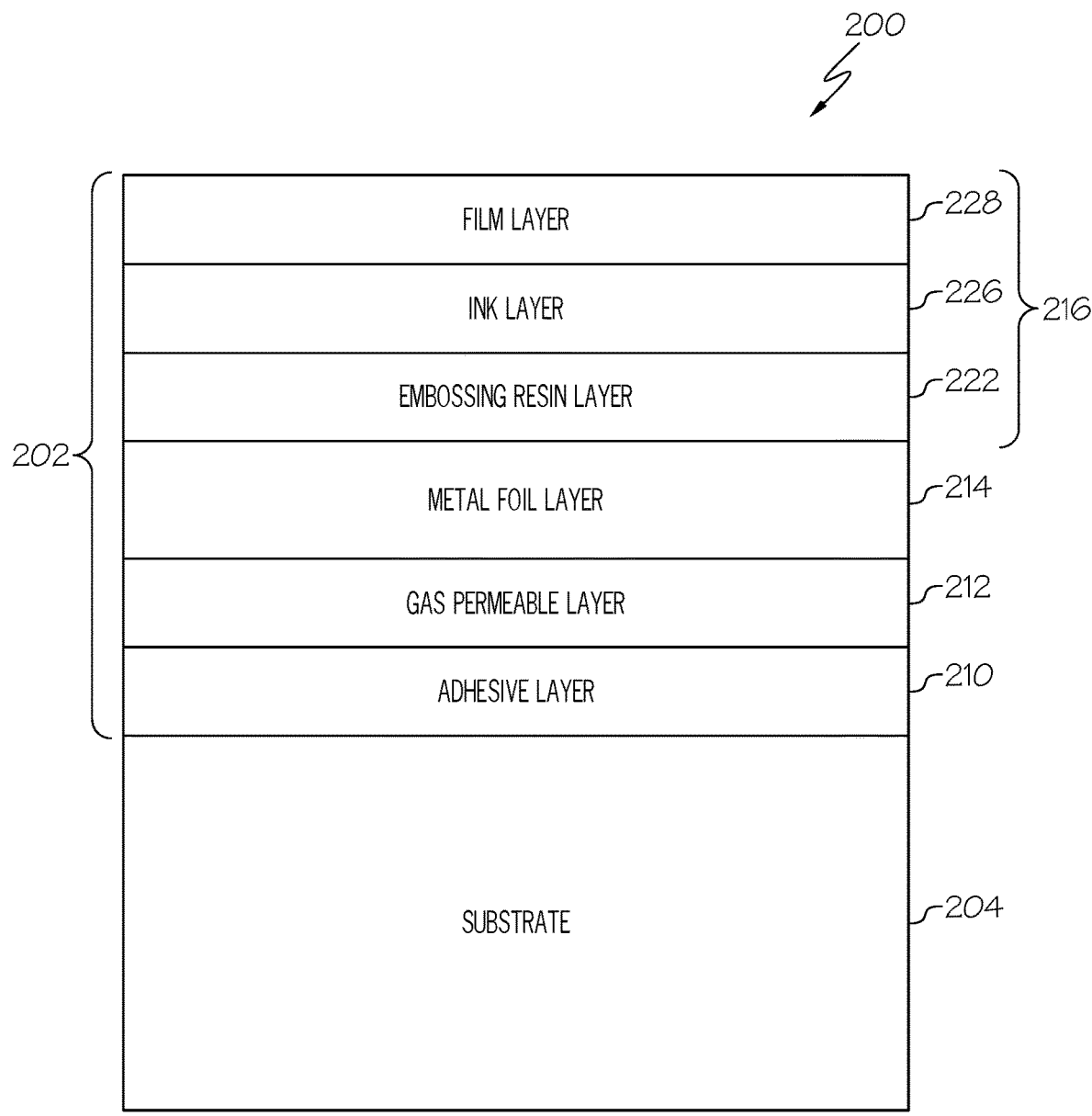
FIG. 3 is a schematic cross-sectional view of another example of a fire-resistant, gas permeable decorative laminate, shown applied to a substrate to form a decorative structure.

Referring to FIG. 3, in another example, a decorative structure, generally designated 200, may include a fire-resistant, gas permeable decorative laminate 202 and a substrate 204. The fire-resistant, gas permeable decorative laminate 202 may include an adhesive layer 210, a gas permeable layer 212, a decorative layered structure 216 and an optional metal foil layer 214. The adhesive layer 210, the gas permeable layer 212 and the metal foil layer 214 of the fire-resistant, gas permeable decorative laminate 202 may be configured as described above. However, the decorative layered structure 216 of the fire-resistant, gas permeable decorative laminate 202 may differ. Specifically, the decorative layered structure 216 may include an embossing resin layer 222, an ink layer 226 and one film layer, for example, a first film layer 228, but no second film layer.

Figure 4:
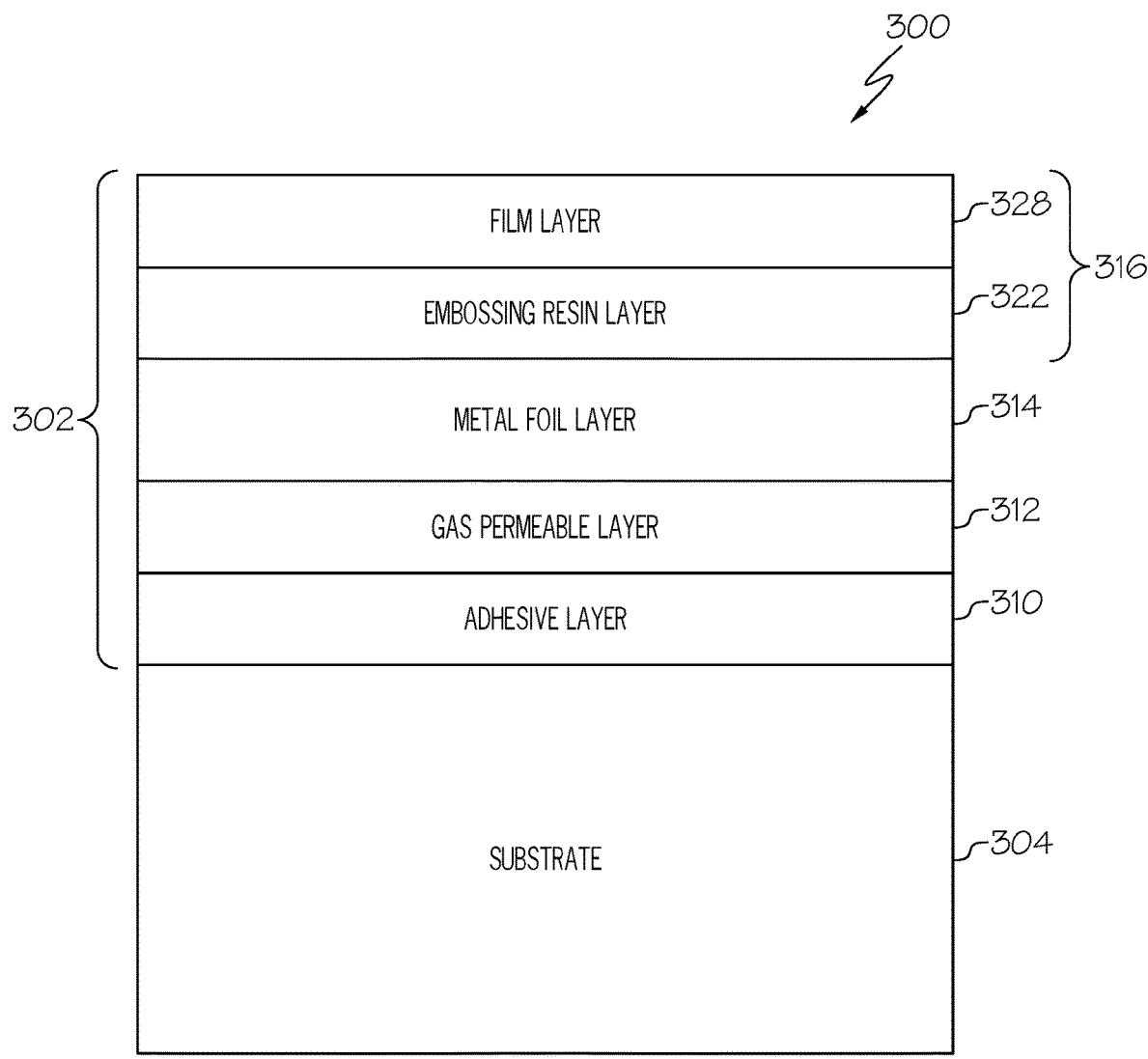
FIG. 4 is a schematic cross-sectional view of yet another example of a fire-resistant, gas permeable decorative laminate, shown applied to a substrate to form a decorative structure.

Referring to FIG. 4, in yet another example, a decorative structure, generally designated 300, may include a fire-resistant, gas permeable decorative laminate 302 and a substrate 304. The fire-resistant, gas permeable decorative laminate 302 may include an adhesive layer 310, a gas permeable layer 312, a decorative layered structure 316 and an optional metal foil layer 314. The adhesive layer 310, the gas permeable layer 312 and the metal foil layer 314 of the fire-resistant, gas permeable decorative laminate 302 may be configured as described above. However, the decorative layered structure 316 of the fire-resistant, gas permeable decorative laminate 302 may differ. Specifically, the decorative layered structure 316 may include an embossing resin layer 322 and a second film layer 328, but no ink layer or first film layer.

At this point, those skilled in the art will appreciate that the decorative layered structures 116, 216, 316 shown and described are only three specific examples of suitable decorative layered structures. Various alternative decorative layered structures may be used without departing from the scope of the present disclosure.

The disclosed decorative structures 1, 100, 200, 300 may be particularly suitable for use in a vehicle, such as a train or an aircraft. For example, the disclosed decorative structures 1, 100, 200, 300 may be used to construct interior panels on an aircraft, such as a passenger cabin sidewall and/or a passenger cabin floor. However, those skilled in the art will appreciate that the disclosed decorative structures 1, 100, 200, 300 may be used in a variety of applications, including non-aerospace applications (e.g., in automotive applications, watercraft applications, commercial and residential construction applications, and the like).

Figure 5:
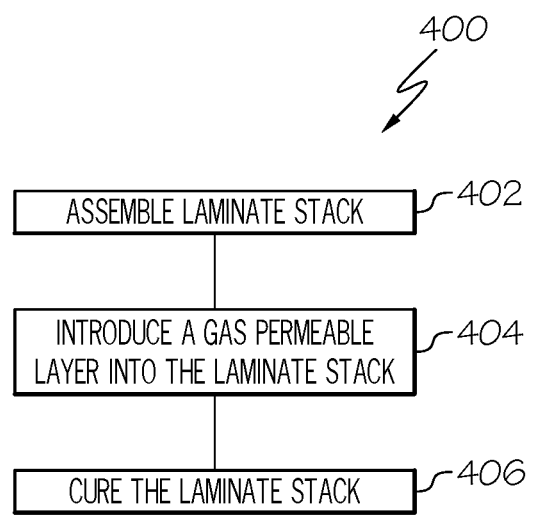
FIG. 5 is a flow diagram depicting one example of the disclosed method for manufacturing a decorative laminate.

Referring to FIG. 5, also disclosed is a method 400 for manufacturing a decorative laminate. The method 400 may begin at Block 402 with the step of assembling a laminate stack that includes multiple layers. The layers of the laminate stack may include one or more decorative layers (see layers 122, 124, 126, 128 of the decorative layered structure 116 in FIG. 2), an optional adhesive layer (see adhesive layer 110 in FIG. 2), and an optional metal foil layer (see metal foil layer 114 in FIG. 2), among other possible layers.

At Block 404, a gas permeable layer may be introduced to the laminate stack, as shown by the gas permeable layer 112 in FIG. 2. As one example, the gas permeable layer may be introduced vertically below the decorative layers such that the gas permeable layer is opposed from the outermost surface defined by the decorative layers. As another example, the gas permeable layer may be introduced between the adhesive layer and the decorative layers. As yet another example, the gas permeable layer may be introduced between the adhesive layer and the metal foil layer.

Optionally, at Block 406, the laminate stack may be cured. The parameters of the curing step (Block 406) may depend on the composition of the laminate stack. For example, the laminate stack may be placed in a press, and a heated die may apply sufficient temperature and pressure to cure the laminate stack to form the disclosed fire-resistant, gas permeable decorative laminate. Optionally, the die may transfer a texture/relief pattern to the laminate stack during the curing step.

Figure 6:
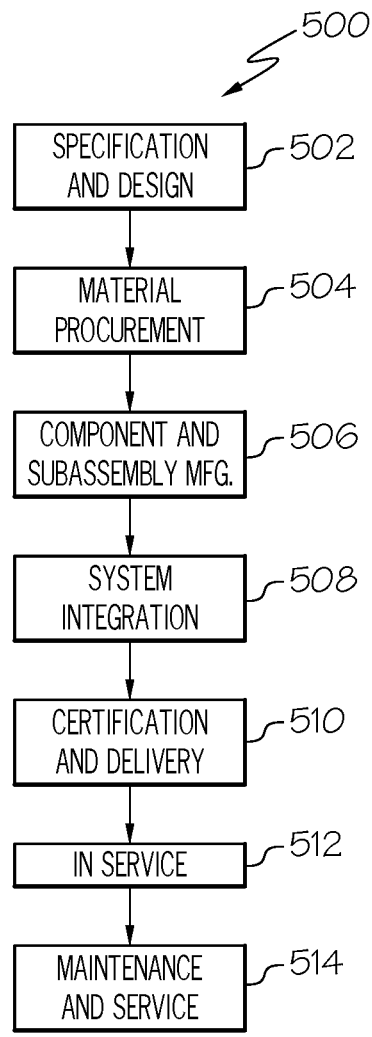
FIG. 6 is a flow diagram of an aircraft manufacturing and service methodology.
Figure 7:
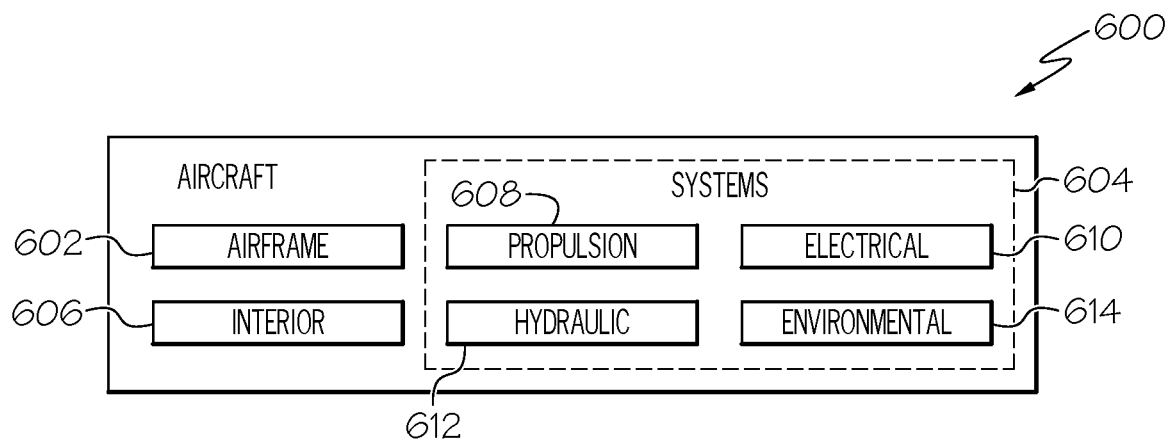
FIG. 7 is a block diagram of an aircraft.

Examples of the present disclosure may be described in the context of an aircraft manufacturing and service method 500 as shown in FIG. 6 and an aircraft 600 as shown in FIG. 7. During pre-production, the illustrative method 500 may include specification and design, as shown at block 502, of the aircraft 600 and material procurement, as shown at block 504. During production, component and subassembly manufacturing, as shown at block 506, and system integration, as shown at block 508, of the aircraft 600 may take place. Thereafter, the aircraft 600 may go through certification and delivery, as shown block 510, to be placed in service, as shown at block 512. While in service, the aircraft 600 may be scheduled for routine maintenance and service, as shown at block 514. Routine maintenance and service may include modification, reconfiguration, refurbishment, etc. of one or more systems of the aircraft 600.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, the aircraft 600 produced by illustrative method 500 (FIG. 6) may include airframe 602 with a plurality of high-level systems 604 and interior 606. Examples of high-level systems 604 may include one or more of propulsion system 608, electrical system 610, hydraulic system 612, and environmental system 614. Any number of other systems may be included. Although an aerospace example is shown, the principles disclosed herein may be applied to other industries, such as the automotive and marine industries. Accordingly, in addition to the aircraft 600, the principles disclosed herein may apply to other vehicles (e.g., land vehicles, marine vehicles, space vehicles, etc.).

The disclosed fire-resistant, gas permeable decorative laminate may be employed during any one or more of the stages of the manufacturing and service method 500. For example, components or subassemblies corresponding to component and subassembly manufacturing (block 506) may be fabricated or manufactured using the disclosed fire-resistant, gas permeable decorative laminate. Also, the disclosed fire-resistant, gas permeable decorative laminate may be utilized during production stages (blocks 506 and 508), for example, by substantially expediting assembly of or reducing the cost of aircraft 600. Similarly, the disclosed fire-resistant, gas permeable decorative laminate may be utilized, for example and without limitation, while aircraft 600 is in service (block 512) and/or during the maintenance and service stage (block 514).

Although various aspects of the disclosed fire-resistant, gas permeable decorative laminate have been shown and described, modifications may occur to those skilled in the art upon reading the specification. The present application includes such modifications and is limited only by the scope of the claims.

What is claimed is:

1. A method for manufacturing a decorative laminate comprising:
   assembling a laminate stack comprising at least one decorative layer and a gas permeable layer, wherein the gas permeable layer comprises voids; and
   positioning a metal foil gas barrier layer in the laminate stack between the gas permeable layer and the decorative layer.

2. The method of claim 1 further comprising, after the positioning, curing the laminate stack.

3. The method of claim 2 further comprising, prior to the curing, embossing the laminate stack.

4. The method of claim 1 wherein the gas permeable layer comprises a woven material.

5. The method of claim 1 wherein the gas permeable layer comprises at least one of spun bond polymer, melt blown polymer, felt, fiberglass, and woven aramid fabric.

6. The method of claim 1 wherein the gas permeable layer defines a continuous void structure that extends throughout the gas permeable layer.

7. The method of claim 6 wherein the assembling the laminate stack comprises assembling such that a first surface of the gas permeable layer faces the decorative layer and a second surface of the gas permeable layer is opposed from the first surface, and wherein the continuous void structure defines a flow path for permeating gases from the second surface through the gas permeable layer.

8. The method of claim 1 wherein the voids of the gas permeable layer are continuous voids extending in x-axis, y-axis, and z-axis directions through the gas permeable layer such that gases permeate in the x-axis, y-axis, and z-axis directions through the gas permeable layer.

9. The method of claim 1 wherein the assembling comprises assembling the laminate stack comprising the gas permeable layer, at least one first decorative layer and at least one second decorative layer.

10. The method of claim 9 wherein the at least one first decorative layer comprises an embossing resin layer.

11. The method of claim 10 wherein the at least one second decorative layer comprises a film layer.

12. The method of claim 11 wherein the assembling further comprises assembling the laminate stack comprising at least one third decorative layer, wherein the at least one third decorative layer comprising an ink layer.

13. The method of claim 1 further comprising applying an adhesive layer to the laminate stack such that the gas permeable layer is positioned between the adhesive layer and the metal foil gas barrier layer.

14. The method of claim 13 wherein the adhesive layer comprises a pressure sensitive adhesive.

15. A method for manufacturing a decorative laminate comprising:
   assembling a laminate stack comprising a plurality of layers, said plurality of layers comprising at least one decorative layer, a gas barrier layer, and an adhesive layer; and
   introducing to said laminate stack a gas permeable layer, said gas permeable layer being positioned adjacent to the gas barrier layer and between said gas barrier layer and said adhesive layer,
   wherein the gas barrier layer comprises a metal foil.

16. A method for manufacturing a decorative structure comprising:

adhering to a surface of a substrate a decorative laminate comprising:
- a decorative layered structure;
- a gas permeable layer underlying the decorative layered structure, wherein the gas permeable layer comprises voids; and
- a metal foil gas barrier layer positioned between the gas permeable layer and the decorative layered structure.

17. The method of claim 16 wherein the substrate comprises a honeycomb core and a liner skin connected to the honeycomb core, and wherein the adhering to the surface of the substrate comprises adhering to a surface of the liner skin.

18. The method of claim 16 wherein the adhering comprising applying an adhesive between the decorative laminate and the surface of the substrate.

19. The method of claim 16 further comprising:
assembling a laminate stack comprising the decorative layered structure, the gas permeable layer, and the metal foil gas barrier layer such that the metal foil gas barrier layer is between the gas permeable layer and the decorative layered structure; and
curing the laminate stack to yield the decorative laminate.

20. The method of claim 15 further comprising applying the adhesive layer to the laminate stack such that the gas permeable layer is positioned between the adhesive layer and the gas barrier layer.

\* \* \* \* \*